United States Patent [19]

Browne

[11] Patent Number: 5,046,693

[45] Date of Patent: Sep. 10, 1991

[54] MICROPHONE STAND COUPLER

[76] Inventor: William A. Browne, 16838 Weddington St., Encino, Calif. 91436

[21] Appl. No.: 589,198

[22] Filed: Sep. 26, 1990

[51] Int. Cl.$^5$ .............................................. F16B 2/00
[52] U.S. Cl. .................................. 248/159; 403/290; 403/371
[58] Field of Search ..................... 248/159, 158, 188.1; 403/290, 371, 277; 411/55, 60, 61

[56] References Cited

U.S. PATENT DOCUMENTS

| 720,658 | 2/1903 | Bobo | 403/290 |
|---|---|---|---|
| 1,182,288 | 5/1916 | Mack | 403/290 |
| 1,267,075 | 5/1918 | Hubbell | 403/290 |
| 1,739,740 | 12/1929 | Stoeltzlen | 403/371 |
| 4,725,162 | 2/1988 | Haller | 403/290 |
| 4,977,848 | 12/1990 | Currey | 248/158 |

FOREIGN PATENT DOCUMENTS 477731 10/1951 Canada ............................... 403/371

Primary Examiner—Ramon O. Ramirez
Assistant Examiner—Robert A. Olson
Attorney, Agent, or Firm—Spensley Horn Jubas & Lubitz

[57] ABSTRACT

A microphone stand coupler that facilitates microphone stand assembly and disassembly by enabling users to quickly and easily snap a microphone pole into a microphone stand base. In the preferred embodiment of the present invention, the microphone stand coupler is manufactured with hollow piping that is tapered and closed at one end. The interior of the piping is preferably threaded to accommodate the microphone pole. At the closed and tapered end of the coupler, a threaded hole is provided to accommodate a base attachment mechanism. The coupler is inserted through an opening in the microphone stand base, and the coupler is secured to the base by a over-center cam lever that is part of the base attachment mechanism. A microphone pole may then be threaded into the open end of the microphone stand coupler. The coupler and attached microphone pole may be detached from the base by disengaging the base attachment lever. The invention thus comprises a bayonet-type coupler that permits a microphone pole to be quickly detached from or attached to a microphone stand base.

8 Claims, 2 Drawing Sheets

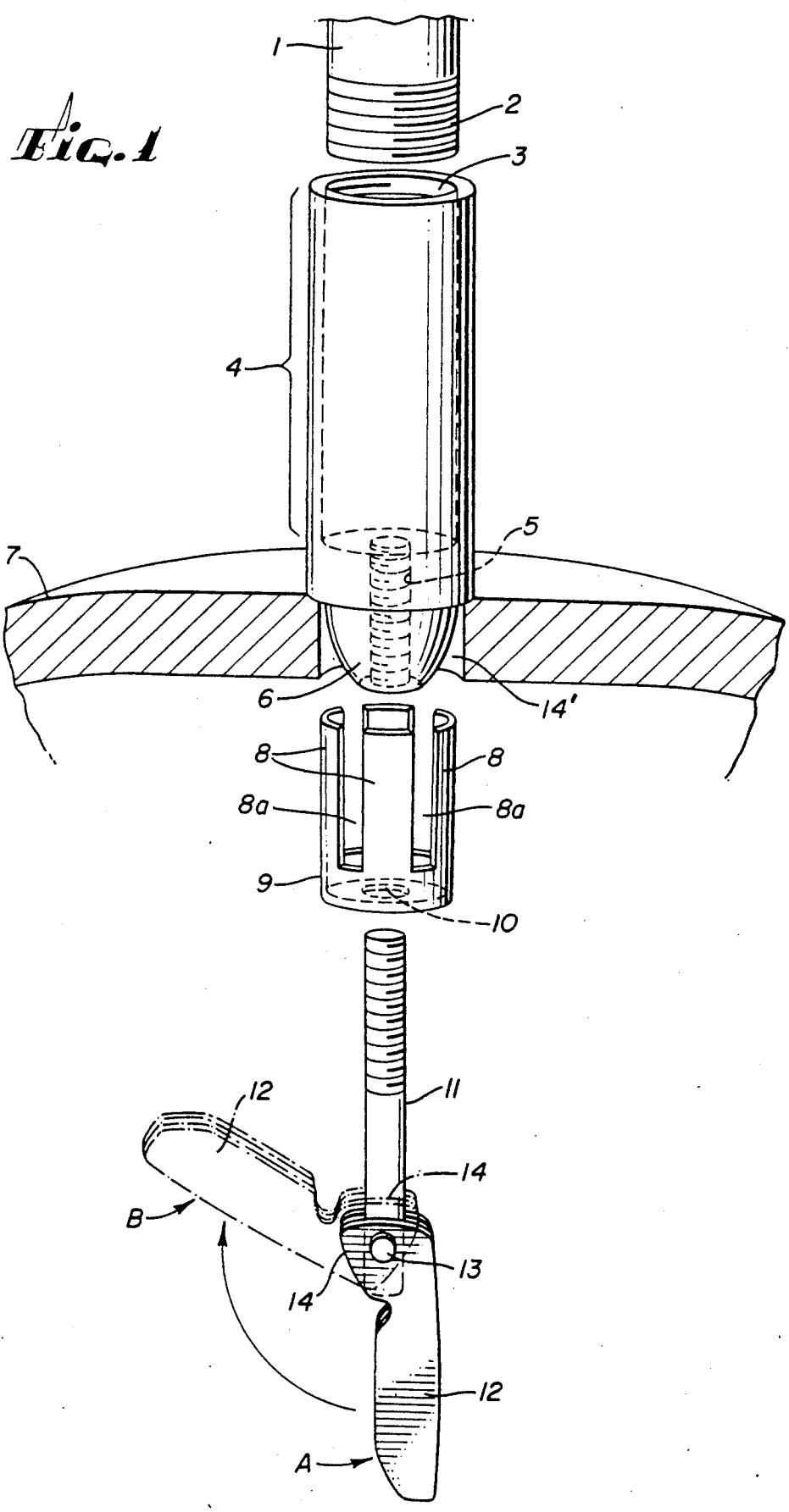

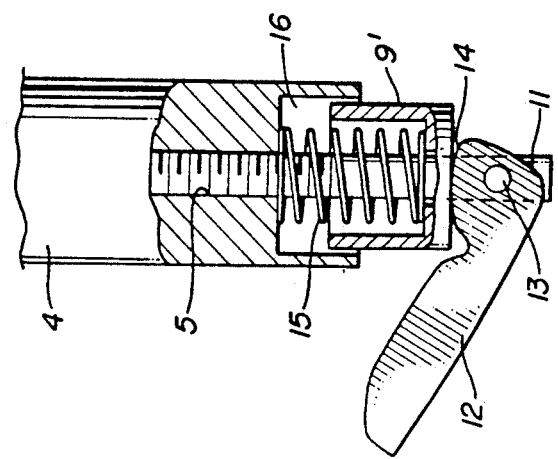
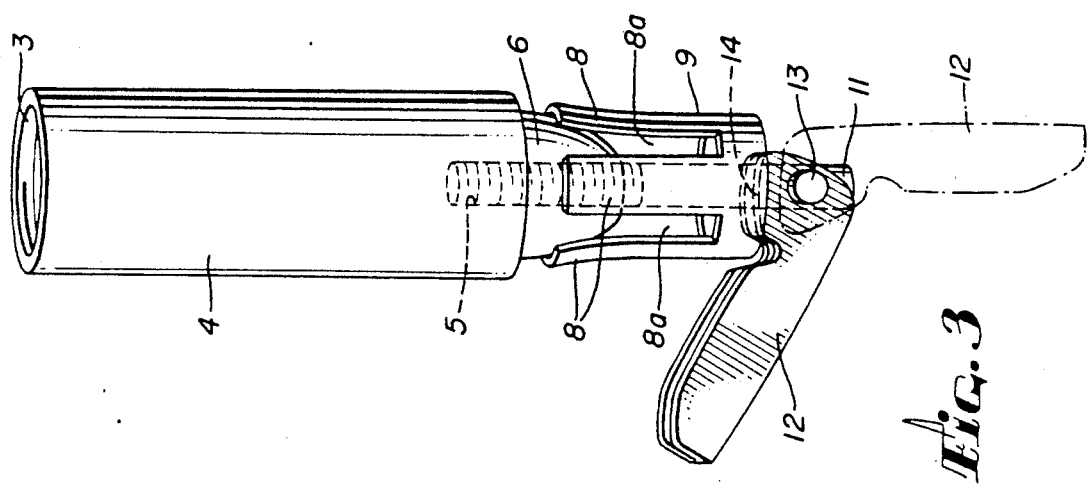
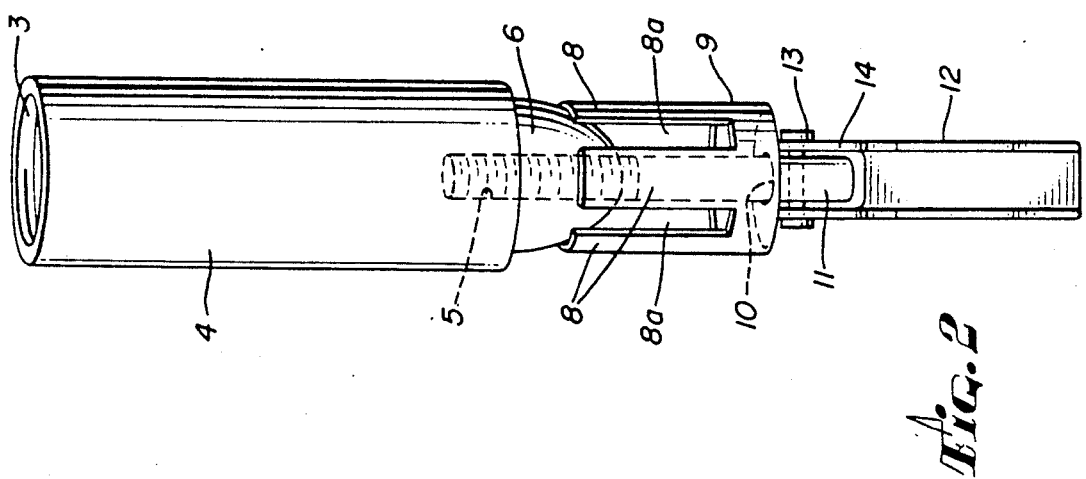

MICROPHONE STAND COUPLER

BACKGROUND OF INVENTION

1. Field of the Invention

This invention relates to microphone stand assemblies, and more particularly, to a coupler for easily and rapidly assembling and disassembling a microphone pole and a microphone stand base.

2. Related Art

Microphone stand assemblies comprise a threaded microphone pole attached to a weighted base by screwing the pole into the base. A typical professional microphone pole has approximately one inch of threading. Consequently, assembling and disassembling a microphone pole and base is a time consuming and potentially destructive process, due to the possibility of cross-threading.

Further, during use, microphone poles often break due to metal fatigue and strain at the point of attachment. The poles are typically discarded when broken, although they may be re-threaded at expense and inconvenience.

Therefore, it is desirable to provide a means for eliminating or alleviating these problems. This invention discloses such a means in the form of an improved microphone stand assembly utilizing a microphone stand coupler.

SUMMARY OF THE INVENTION

The present invention reduces microphone stand assembly time. More specifically, a reduction in the time required to attach/detach a microphone pole to/from a microphone stand base is accomplished by using a microphone stand coupler. The microphone stand coupler facilitates microphone stand assembly and disassembly by enabling users to quickly and easily snap a microphone pole into a microphone stand base.

In the preferred embodiment of the present invention, the microphone stand coupler is manufactured with hollow tubing that is tapered and closed at one end. The interior of the piping is preferably threaded to accommodate the microphone pole. At the closed and tapered end of the coupler, a threaded hole is provided to accommodate a base attachment mechanism.

The coupler is inserted through an opening in the microphone stand base, and the coupler is secured to the base by an over-center cam lever that is part of the base attachment mechanism. A microphone pole may then be threaded into the open end of the microphone stand coupler. The coupler and attached microphone pole may be detached from the base by disengaging the base attachment lever.

The invention thus comprises a bayonet-type coupler that permits a microphone pole to be quickly detached from or attached to a microphone stand base. A reduction in assembly time and pole breakage will result by utilizing the coupler disclosed in this patent specification.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 1 is an exploded side perspective view of the preferred embodiment of the present invention shown in both the locked and unlocked positions. The invention is shown as it would be used with a microphone pole and microphone stand base.

FIG. 2 shows a front perspective, partially phantom view of the preferred embodiment of the present invention without a microphone pole or microphone stand base. The invention is shown in the unlocked position.

FIG. 3 shows a side perspective, partially phantom view of the invention in the locked position.

FIG. 4 is a cross-sectional side view of an alternative embodiment of the present invention.

Like reference numbers and designations in the drawings refer to like elements.

DETAILED DESCRIPTION OF THE INVENTION

The following description is of the best presently contemplated modes of carrying out the invention. This description is made for the purpose of illustrating the general principles of the invention and should not be taken in a limiting sense.

FIG. 1 depicts a microphone stand assembly utilizing the present invention. The invention comprises a partially hollow coupler 4 designed to receive a standard microphone pole 1. One end of the pole 2 and the hollow interior 3 of the coupler 4 are threaded to permit the pole 2 to be screwed securely into the coupler 4.

The bottom end 6 of the coupler 4 is tapered and an axial hole 5 is threaded therein to accommodate a threaded tension shaft 11. In the preferred embodiment of the present invention, a cup-shaped collect 9 having side-walls 8 formed by slits 8a is secured to the tapered end 6 of the coupler 4 by inserting the tension shaft 11 through a hole 10 in the collet 9. The tension shaft 11 is screwed into the coupler hole 5. The collet 9 is sized to be inserted through a hole 14 in a standard microphone stand base 7.

A lever 12 is attached to the other end of the tension shaft 11 by a pivot rod 13. The lever 12 is pivotable about the pivot rod 13 from an unlocked position A to a locked position B (shown in outline in FIG. 1). The lever 12 includes a cam surface 14 that provides an over-center point that requires a positive force to be applied to the lever 12 to move the lever 12 between the unlocked position A to the locked position B.

FIG. 2 shows the present embodiment of the invention without a microphone pole 1 or base 7. The invention is shown with the lever 12 in the unlocked (i.e., open) position A.

FIG. 3 shows a side view of the preferred embodiment of the present invention. When the lever 12 is in the locked (i.e., closed) position B, the collet 9 is forced toward the tapered end 6 of the coupler 4. The tapered end 6 forces the sidewalls 8 of the collet 9 outward, towards the inner wall of the hole 14 through the microphone stand base 7. The sidewalls 8 thus serve as leaf springs. In the preferred embodiment, the unconstrained expanded diameter of the collet 9 in the locked position B is slightly larger than the diameter of the microphone stand hole 14 (FIG. 1). Forcing the sidewalls 8 outward firmly attaches the coupler 4 to the microphone stand base 7.

In an alternative embodiment, the expanded diameter of the collet 9 does not engage the inner wall of the microphone stand hole 14. Instead, expansion of the collet 9 serves to provide the spring force necessary for the over-center cam action of the lever 12 to secure the coupler 4 to the microphone stand base 7 by tension on the tension shaft 11.

An alternative embodiment of the invention, shown in FIG. 4, employs a compression spring 15. In this embodiment, the coupler 4 is not tapered at the bottom end 6. Instead, a recess 16 is bored out in the bottom end 6 in order to accommodate an un-slitted collet 9'. When the lever 12 is moved to its locked position B, the collet 9' compresses the compression spring 15. In this embodiment, the collet 9 and spring 15 serve to provide the spring force necessary for the over-center cam action of the lever 12 to secure the coupler 4 to the microphone stand base 7 by tension on the tension shaft 11.

Once a microphone pole 1 is attached to the coupler 4, the pole 1 may be quickly attached to or detached from the microphone stand base 7 by locking or unlocking the lever 12 and removing the coupler 4 and pole 1 as a unit from the base 7. The coupler 4 also shifts the point of stress in a microphone stand assembly from the threaded coupling of the microphone pole 1 with the microphone stand base 7 to the bayonet-type connection of the coupler 4 to the base 7. If the coupler 4 is damaged or broken, only the coupler 4 need be replaced.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

I claim:

1. A microphone stand coupler for connecting a threaded microphone stand pole to a microphone stand base having a hole normally for receiving the microphone stand pole, comprising:
   a. a tube having a first end threaded to receive the microphone pole, and a second end adapted to receive a tension shaft;
   b. a cam lever movable between a first position and a second position;
   c. a tension shaft having a first end pivotably coupled to the cam lever and a second end coupled to the second end of the tube;
   d. a collet and spring means interposed between the cam lever and the second end of the tube, for providing a spring force opposing the movement of the cam lever between the first position and the second position;
   wherein the microphone stand pole is attachable to the microphone stand base by screwing the microphone stand pole into the first end of the tube, inserting the second end of the tube through the hole of the microphone stand base, and moving the cam lever from the first position to the second position.

2. The microphone stand coupler of claim 1, wherein the second end of the tube is tapered, and the collet and spring means comprises a slit-sided, cup-shaped collet positioned adjacent the tapered end of the tube, and expandable from a first diameter to a second diameter when forced against the tapered end of the tube when the cam lever is moved from the first position to the second position.

3. The microphone stand coupler of claim 2, wherein the unconstrained expanded diameter of the collet is greater then the inside diameter of the hole of the microphone stand base:

4. The microphone stand coupler of claim 1, wherein the collet and spring means comprises:
   a. a collet; and
   b. a compression spring positioned between the second end of the tube and the collet.

5. A microphone stand assembly, comprising:
   a. a threaded microphone stand pole;
   b. a microphone stand base having a hole normally for receiving the microphone stand pole;
   c. a tube having a first end threaded to receive the microphone pole, and a second end adapted to receive a tension shaft;
   d. a cam lever movable between a first position and a second position;
   e. a tension shaft having a first end pivotably coupled to the cam lever and a second end coupled to the second end of the tube;
   f. a collet and spring means interposed between the cam lever and the second end of the tube, for providing a spring force opposing the movement of the cam lever between the first position and the second position;
   wherein the microphone stand pole is attachable to the microphone stand base by screwing the microphone stand pole into the first end of the tube, inserting the second end of the tube through the hole of the microphone stand base, and moving the cam lever from the first position to the second position.

6. The microphone stand assembly of claim 5, wherein the second end of the tube is tapered, and the collet and spring means comprises a slit-sided, cup-shaped collet positioned adjacent the tapered end of the tube, and expandable from a first diameter to a second diameter when forced against the tapered end of the tube when the cam lever is moved from the first position to the second position.

7. The microphone stand assembly of claim 6, wherein the unconstrained expanded diameter of the collet is greater then the inside diameter of the hole of the microphone stand base.

8. The microphone stand assembly of claim 5, wherein the collet and spring means comprises:
   a. a collet; and
   b. a compression spring positioned between the second end of the tube and the collet.

* * * * *